United States Patent [19]
Gold

[11] 3,843,793
[45] Oct. 22, 1974

[54] METHOD FOR THE TREATMENT OF BENIGN PROSTATIC HYPERTROPHY AND ACNE

[75] Inventor: Elijah H. Gold, West Orange, N.J.

[73] Assignee: Schering Corporation, Bloomfield, N.J.

[22] Filed: Oct. 26, 1972

[21] Appl. No.: 301,024

Related U.S. Application Data

[63] Continuation of Ser. No. 263,906, July 19, 1972, abandoned.

[52] U.S. Cl. .............................................. 424/324
[51] Int. Cl. ............................................ A61k 27/00
[58] Field of Search .................................... 424/324

[56] References Cited
UNITED STATES PATENTS 3,108,038  10/1963  Fielding et al. ..................... 424/324
3,426,049  2/1969  Baker ................................. 424/324

*Primary Examiner*—Sam Rosen
*Attorney, Agent, or Firm*—Raymond A. McDonald; Stephen B. Coan

[57] ABSTRACT

This invention relates to the method of eliciting an antiandrogenic effect useful in the treatment of such diseases as benign prostatic hypertrophy and acne, by the administration to a mammal suffering from such diseases a therapeutically effective quantity of certain alkenyl anilides, e.g., 3-methyl-4'-nitro-3'-trifluoromethyl-3-butenanilide.

7 Claims, No Drawings

METHOD FOR THE TREATMENT OF BENIGN PROSTATIC HYPERTROPHY AND ACNE

This application is a continuation of my copending application Ser. No. 263,906, filed July 19, 1972, now abandoned.

This invention relates to the preparation and use of compositions containing certain substituted alkenyl anilides.

The compounds to be used in this invention may be represented by the structural formula:

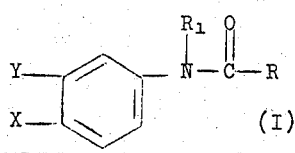

wherein X is nitro, trifluoromethyl, chloro, bromo or iodo; Y is hydrogen, chloro, bromo, iodo, nitro, lower alkyl, hydroxy, lower alkoxy, polyfluoroloweralkoxy, polyfluoroloweralkyl, trifluoromethylthio, trifluoromethylsulfoxy, or trifluoromethylsulfonyl; $R_1$ is hydrogen or lower alkyl having 1 to 3 carbon atoms; and R is branched-chain lower alkenyl with the proviso that the double bond contained in said branched-chain lower alkenyl moiety is not conjugated with the carbonyl moiety.

As used herein the term "lower alkyl" refers to alkyl groups having 1 to 6 carbon atoms, including straight-chain branched-chain and cyclic alkyl groups. Exemplifying lower alkyl radicals are methyl, ethyl, isopropyl, cyclopropyl and hexyl. The term "lower alkoxy" refers to those lower alkyl groups attached to the phenyl moiety through an oxygen atom. The term "polyfluoroloweralkyl" embraces lower alkyl groups wherein at least two of the hydrogen atoms are replaced by fluorine. This term embraces both the partially fluorinated and the perfluoro derivatives. The term "branched-chain lower alkenyl" refers to alkyl groups having 2 to 8 carbon atoms containing at least one unsaturated carbon atom. Exemplifying the branched-chain alkenyl moieties are 2-methyl-3-propenyl, 1-methyl-3-butenyl, 2-ethyl-5-hexenyl, and 1-propyl-4-pentenyl. The term "conjugated" as used herein is according to the stanard art definition as found in Hackh's Chemical Dictionary, 4th Edition, 1969.

The substituted alkenyl anilides to be used in this invention may generally be prepared by the condensation of an appropriately X, Y, R'-substituted aniline with an acyl halide or anhydride; the condensation being effected by heating a mixture of at least equimolar quantities of the reactants optionally in the presence of an acid acceptor. Preferably the heating of the reactants takes place in a suitable solvent at elevated temperatures up to about the reflux temperature of the reaction mixture.

The foregoing reaction may be summarized by the following schematic representation:

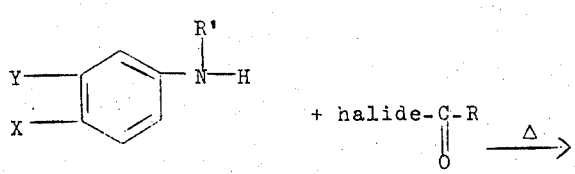 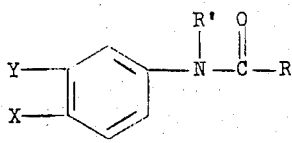

wherein X, Y, R' and R are as previously defined. Techniques for preparing such substituted aniline starting materials are specifically described in Belgian Pat. Nos. 769,148 and 769,149, for example.

Where the desired R'-group of the foregoing substituted anilides is other than hydrogen, it is usually prepared by subjecting the substituted anilide to standard alkylation procedures.

The compounds represented by Formula I exert an anti-androgenic response when administered within the dose range of about 0.1 mg. to about 50 mg. per kg. of body weight per day. They are useful in the treatment, alleviation and/or palliation of androgen-caused or androgen-dependent disorders. Such disorders are considered to be involved in prostatic hypertrophy, the Stein-Leventhal Syndrome, idiopathic, hirsutism and acne.

In those species afflicted with prostatic hypertrophy the frequency of the hypertrophic condition seems to increase with increasing age. With increased longevity, such maladies are on the increase both in man and even among older canine household pets. Hormone therapy, such as the administration of estrogenic substances, has generally not proved to be a particularly desirable treatment. In addition to the undesirable estrogen-induced side effects, such treatment has not proved to be fully efficacious. Surgical ablation, even though effective, is also not particularly desirable for, in addition to the expected 2-3 percent mortality rate, many patients experience such non-fatal complications such as epididymitis, pneumonia, pyelonephritis, secondary resection and the like. Thus, the chemotherapeutic treatment of prostatic hypertrophy with concomitant absence of serious side effects has been a goal long sought.

Compositions of this invention can produce remissions in cases of prostatic hyperplasia while avoiding undesirable effects consequent to standard estrogen therapy or surgical procedures.

Depending upon the severity of the condition, a satisfactory therapeutic response can usually be achieved in a 70 kg. adult mammal, for example, by administration of about 25 to 500 mg. per day of a compound of this invention. In addition to their use as therapeutic agents, the compounds of this invention have a utility in animal husbandry. More specifically, the administration of these compounds is useful in reducing the objectionable androgen-caused odor normally associated with the meat of male animal species; in controlling or eliminating the birth of normal males; and also for reducing the aggressive tendencies of the male animals species. These actions, of course, require such administration at the appropriate stage of the animal's life cycle. It has been long known that male bovine or porcine species are not particularly suitable as meat-producing animals. It is also known that the male animal grows at a faster rate, usually weighs more and produces a leaner carcass than does the corresponding female species. One attempt at converting the male into a more suitable commercial meat source has been by surgical castration (i.e., removal of the androgen source). However, this method has not been completely satisfactory for it involves a time-consuming process and often times leads to post-surgical problems such as infections.

The administration of a therapeutically effective quantity of compositions of this invention produces substantially the same results sought by surgical castration. These agents may be referred to as chemical castrating agents. The aforementioned undesirable meat-growth characteristics can be obviated when compositions of this invention are administered according to the process aspect of this invention and thus a more suitable animal species is available for commercial use. In addition to the enhanced growth characteristics, the meat of these chemically castrated male animal species does not possess the noxious odor usually associated with such animals. This noxious odor is particularly manifested by the pig species wherein the meat of the males, upon cooking, emits the well-known and quite repugnant "boar-odor" rendering the meat product unpalatable and hence unsuitable for human consumption. Although the application of this discovery is particularly suitable for the treatment of pigs, it also may be used for treating other animals species such as cattle, horses, sheep, oxen, hogs, goats and the like. Compositions of this invention may also be used for chemical castration for eliciting the desired effect in such avian species as drakes, ganders, roosters, and the like, such application, being only during the development of the secondary sex characteristics of the males.

In another application, these compositions have the additional ability to reduce the aggressive tendencies normally associated with the male animal species. This aspect is particularly useful for the treatment of valuable zoological species such as lions, tigers, and elephants.

These compositions may also be useful as pest control agents whereby they decrease the population of an undesired species by ineffectuating the male members.

The hereinabove described chemical castration processes may be affected in two manners. In mammals, the desired chemical castration of a fetal male may be obtained by administering a therapeutically effective quantity of compositions containing compounds of formula I to the gravid female of a domesticated species at a time beginning immediately prior to the development of the fetal genitalia and ending immediately after the normal period of development of the fetal genitalia. The results of this administration is that the litter produced will be devoid of all normal male species and will consist solely of females and "pseudo-hermaphrodites," the latter having some female anatomical structures (e.g., a clitoroal-like penis and a vaginal tract). The time of gestation during which the fetal genitals develop is documented for many animal species and where such information is not available in the literature, the period may be determined by methods well known to the art.

The second process involves chemically castrating a male member of a domesticated animal species and comprises the administration of a therapeutically effective quantity of compositions containing compounds of Formula I to said species at a time immediately prior to and ending immediately after the development of the secondary sex characteristics in said animal species so as to produce the desired effect.

The substituted alkenyl anilides (I) of this invention can be administered orally in the form of tablets, capsules, elixirs, and the like or may be administered by parenteral injection or by suppository. In tablet form they are compounded with an inert pharmaceutical carrier which may contain a suitable binder such as gums, starches, and sugars. They may also be incorporated into gelatin capsules, or formulated into syrups or elixirs which have the advantage of being susceptible to manipulations in flavor by the addition of standard natural or synthetic flavoring agents. Highly satisfactory administration may also be achieved in the form of aqueous parenteral suspensions.

These pharmaceutically acceptable dosage units, capable of eliciting a desired response in accordance with the teachings of this invention, should be so proportioned as to afford a preferred dosage unit of from about 1 to about 100 mg., of active substituted alkenyl anilide. Particularly preferred are unit dosages ranging from about 5 to about 25 mg.

Furthermore, the therapeutically active compounds may be admixed directly with the food of the species to which the administration is desired, at sufficient levels to constitute the desired dosage.

Representative formulations containing the compositions of this invention are as follows:

TABLET FORMULATIONS

| Formula A (5 mg.) | Milligrams per Tablet |
| --- | --- |
| 3-Methyl-4'-Nitro-3'-Trifluoro-Methyl-3-Butenanilide | 5.0 |
| Starch, Food Grade | 5.0 |
| Lactose, U.S.P. (Spray Dried) | 89.5 |
| Magnesium Stearate, U.S.P. | 0.5 |
| | 100.0 |
| Formula B (25 mg.) | |
| 3-Methyl-4'-Nitro-3'-Trifluoro-Methyl-3-Butenanilide | 25.0 |
| Starch, Food Grade | 10.0 |
| Lactose, U.S.P. (Spray Dried) | 164.0 |
| Magnesium Stearate, U.S.P. | 1.0 |
| | 200.0 |

Pass the 3-methyl-4'-nitro-3'-trifluoromethyl-3-butenanilide through a high speed mill equipped with a 100 to 150 mesh screen. Blend the milled 3-methyl-4'-nitro-3'-trifluoromethyl-3-butenanilide with the starch in a suitable mixing vessel. Add an equal weight of the spray dried lactose to the blend and mix until uniform. Combine the resultant blend with the remainder of the spray dried lactose and mix until uniform. Charge the magnesium stearate with a portion of the active tablet mix and blend. Blend the magnesium stearate mix with the remaining active tablet base. Continue mixing until uniform. Compress to target weight (100.0 mg. for 5 mg. tablet and 200.0 mg. for 25 mg. tablet).

CAPSULE FORMULATIONS

| Formula | Milligrams per Capsule |
| --- | --- |
| 2,3-Dimethyl-4'-Nitro-3'-Trifluoro-Methyl-3-Butenanilide | 5.0 |
| Lactose, U.S.P. (Spray Dried) | 292.0 |
| Magnesium Stearate, U.S.P. | 3.0 |
| | 300.0 |

Blen ingredients until uniformly mixed. Fill into hard gelatin capsule.

PARENTERAL SUSPENSION

| Formula A (5 mg.) | Milligrams per Milliliter |
| --- | --- |
| 3-Methyl-3',4'-Ditrifluoromethyl-3-Butenanilide | 5.00 |
| Methyl Cellulose 15 cps. U.S.P. | 0.05 |
| Sodium Citrate, Dihydrate | 6.00 |
| Benzyl Alcohol, NF. | 9.00 |
| Methylparaben, U.S.P. | 1.80 |
| Propylparaben, U.S.P. | 0.20 |
| Water for Injection, U.S.P. | 1.00 |
| Formula B (25 mg.) | Milligrams per Milliliter |
| 3-Methyl-3',4'-Ditrifluoromethyl-3-Butenanilide | 25.00 |
| Methyl Cellulose 15 cps. U.S.P. | 0.25 |
| Sodium Citrate, Dihydrate | 30.00 |
| Benzyl Alcohol, NF | 9.00 |
| Methylparaben, U.S.P. | 1.80 |
| Propylparaben, U.S.P. | 0.20 |
| Water for Injection, U.S.P. q.s. a.d. | 1.00 |

Charge 45 liters of water for injection into a suitable stainless steel vessel and heat to 85°–90°C. With vigorous agitation, slowly sprinkle the methyl cellulose into the hot water (5 mg. for formula A or 25 for formula B). Agitate until the methyl cellulose is thoroughly dispersed and wetted. Add approximately, 30 liters of cold (0°–5°C) water for injection. Cool the entire mixture to 8°C. Dissolve the sodium citrate (600 gm. of formula A or 3,000 gm. for formula B) in enough water for injection to make 5 liters of solution. Slowly and with agitation add this solution to the cooled methyl cellulose solution. Dissolve the parabens (180 gm. of methyl and 20 gm. of propyl) in 900 gm. of benzyl alcohol which has been heated to 30°C. Charge this solution to the chilled methyl cellulose solution. Bring the resulting solution to 90 liters with water for injection and agitate until uniform. In a sterile area, pass the batch through a sterile filter. Aseptically transfer about 3.5 liters of the sterile methyl cellulose solution to a separate container reserving the remainder of the batch in a sterile stainless steel mixing tank. Slurry the 3-methyl-3',4'-ditrifluoromethyl-3-butenanilide in sterile colloid mill with about 2 liters of the separated methyl cellulose solution and add the slurry to the solution in the mixing tank. Rinse the slurry container and the mill with the remaining 1.5 liters of reserved methyl cellulose solution and add the rinse to the mixing tank. Rinse the slurry container and mill with 2 liters of water for injection and add the rinse to the mixing tank. Adjust the volume in the mixing tank to 100 liters with water for injection and agitate until uniform. The batch affords 100 liters of sterile suspension having the proportions of formula A or formula B.

The following examples are illustrative of the preparation of representative compounds to be utilized in the composition and process aspects of this invention.

EXAMPLE 1

3-Methyl-4'-nitro-3'-trifluoromethyl-3-butenanilide

Reflux 10.3 g. of 4-nitro-3-trifluoromethylaniline and 7.1 g. of 3-methyl-3-butenoyl chloride in dry benzene for 16 hours, filter off the product of this example and recrystallize it from benzene.

Similarly by substituting for the 4-nitro-3-trifluoromethyl aniline reactant equivalent quantities of an appropriately R', X, Y-substituted aniline reactant, and by substantially following the foregoing procedure, there is produced the corresponding 3-methyl-X, Y, R'-3-butenanilide.

Correspondingly, the 3-methyl-3-butenoyl chloride reactant may be replaced with equivalent quantities of an appropriate alkenoyl chloride, i.e., one not having a double bond conjugated to the carbonyl function, and by following substantially the same procedure of this example there is produced the desired alkenyl derivative.

EXAMPLE 2

2,3-Dimethyl-4'-nitro-3'-trifluoromethyl-3-butenanilide

Reflux 10.3 g. of 4-nitro-3-trifluoromethylaniline and 8.1 g. of 2,3-dimethyl-3-butenoylchloride in dry benzene.

EXAMPLE 3

4'-Nitro-3'-trifluoromethyl-N,2,3-trimethyl-3-butenanilide

Stir 11.0 g. of N-methyl-4-nitro-3-trifluoromethyl aniline and 8.1 g. of 2,3-dimethyl-3-butenoyl chloride in dry pyridine at room temperature. Pour into 200 ml. of ice-water, extract with ether, wash with 10 percent sulfuric acid, followed by water and then saturated sodium carbonate solution. Dry over magnesium sulfate, filter, remove the solvent and obtain the product of this example.

EXAMPLE 4

4'-Bromo-3-methyl-3'-trifluoromethyl-3-butenanilide

Stir 15.0 g. of 4-bromo-3-trifluoromethylaniline, and 7.0 gm. of 3-methyl-3-butenoyl chloride in 75 ml. of dry pyridine at room temperature. Pour the mixture into 600 ml. of ice-water. Filter and dry the precipitate which is the product of this example.

By replacing the 4-bromo-3-trifluoromethylaniline reactant used in the foregoing example with equivalent quantities of:
3,4-ditrifluoromethylaniline,
4-chloroaniline,
3-bromo-4-nitroaniline,
3,4-dichloroaniline,
3-iodo-4-nitroaniline,
3-methyl-4-nitroaniline,
3-ethoxy-4-nitroaniline,
N-methyl-3,4-ditrifluoromethylaniline,
4-nitro-3-trifluoromethylsulfoxyaniline, and
4-nitro-3-trifluoromethylsulfonylaniline,
and following substantially the same procedure there is produced:
3', 4'ditrifluoromethyl-3-methyl-3-butenanilide,
4'-chloro-3-methyl-3-butenanilide,
3'-bromo-3-methyl-4'-nitro-3-butenanilide,
3', 4'-dichloro-3-methyl-3-butenanilide,
3'-iodo-3-methyl-4'-nitro-3-butenanilide,
3-methyl-3'-methyl-4'-nitro-3-butenanilide,
3'-ethoxy-3-methyl-4'-nitro-3-butenanilide,
3',4-ditrifluoromethyl-3-N-methyl-3-butenanilide,
3-methyl-4'-nitro-3'-trifluoromethylsulfoxy-3-butenanilide, and
3-methyl-4'-nitro-3'-trifluoromethylsulfonyl-3-butenanilide,
respectively.

Similarly, by replacing the 3-methyl-3-butenoyl chloride reactant of the foregoing example with equivalent quantities of:

2,3-dimethyl-3-butenoylchloride,
3-methyl-3-pentenoylchloride,
2,3-dimethyl-4-pentenoylchloride,
2,3-diethyl-3-butenoylchloride, and
3-ethyl-2-methyl-3-pentenoylchloride,
and following substantially the same procedure, there is produced:
4'-bromo-2,3-dimethyl-3'-trifluoromethyl-3-butenanilide,
4'-bromo-3-methyl-3-trifluoromethyl-3-pentenanilide,
4'-bromo-2,3-dimethyl-3'-trifluoromethyl-4-pentenanilide,
4'-bromo-2,3-diethyl-3'-trifluoromethyl-3-butenanilide, and
4'-bromo-3-ethyl-2-methyl-3'-trifluoromethyl-3-pentenanilide,
respectively.

In those instances wherein it is desired to prepare an X,Y,R',R-substituted anilide which is not specifically shown herein, such compound may be prepared by analogy processes known in the art.

I claim:

1. A method for the treatment of benign prostatic hypertrophy or acne which comprises eliciting an antiandrogenic effect in mammals suffering from benign prostatic hypertrophy or acne by administering an antiandrogenically effective amount of a substituted anilide having the structural formula:

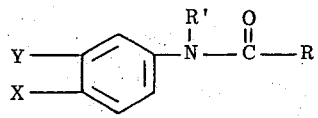

and the non-toxic pharmaceutically acceptable salts thereof wherein X is nitro, trifluoromethyl, chloro, bromo and iodo; Y is a member of the group consisting of hydrogen, chloro, bromo, iodo, nitro, lower alkyl, hydroxy, lower alkoxy, polyfluorolower-alkoxy, polyfluoroloweralkyl, trifluoromethylthio, trifluoromethylsulfoxy, and trifluoromethylsulfonyl; R' is hydrogen and straight-chain lower alkyl having one to three carbon atoms, and R is branched chain lower alkenyl with the proviso that the double bond contained in said lower alkenyl moiety is not conjugated with the carbonyl moiety.

2. A method according to claim 1 wherein Y represents trifluoromethyl, X represents nitro and R' is hydrogen.

3. A method according to claim 2 wherein R represents 3-butenyl.

4. A process according to claim 1 wherein said antiandrogenic effect is administered for the treatment of benign prostatic hypertrophy.

5. A method of claim 4 wherein X represents nitro, Y represents trifluoromethyl and R' represents hydrogen.

6. A method according to claim 5 wherein R represents 3-butenyl.

7. A method according to claim 1 wherein said antiandrogenic effect is useful in the treatment of acne.

* * * * *